United States Patent
Terry, III

(10) Patent No.: US 6,749,367 B1
(45) Date of Patent: Jun. 15, 2004

(54) ORIFICE SHIELD FOR A DRAINAGE CONDUIT IN A WASTEWATER TREATMENT DRAIN FIELD

(75) Inventor: Theophilus B. Terry, III, Hodgenville, KY (US)

(73) Assignee: Harry L. Nurse, Jr., Goshen, KY (US)

( * ) Notice: Subject to any disclaimer, the term of this patent is extended or adjusted under 35 U.S.C. 154(b) by 0 days.

(21) Appl. No.: 10/279,372

(22) Filed: Oct. 24, 2002

(51) Int. Cl.[7] ............................ F16L 58/00; E02B 13/00
(52) U.S. Cl. ................................ 405/48; 138/113
(58) Field of Search ........................... 405/36, 39, 40, 405/43, 45, 48; 138/110, 113

(56) References Cited

U.S. PATENT DOCUMENTS

| | | |
|---|---|---|
| 299,347 A | 5/1884 | Chisholm |
| 460,352 A * | 9/1891 | Reading ................. 405/48 |
| 463,871 A * | 11/1891 | Readking ............... 405/48 |
| 953,080 A | 3/1910 | Wigging ................ 405/48 |
| 2,551,710 A * | 5/1951 | Slaughter .............. 138/113 |
| 3,901,448 A | 8/1975 | Bajin ................... 239/145 |
| 4,182,583 A | 1/1980 | McEntyre .............. 405/40 |
| 4,721,408 A | 1/1988 | Hewlett |
| 4,904,112 A | 2/1990 | McDonald |
| 5,129,758 A | 7/1992 | Lindstrom |
| 5,360,556 A | 11/1994 | Ball et al. |
| 5,433,252 A * | 7/1995 | Wolf et al. ............ 138/113 |
| 5,480,561 A | 1/1996 | Ball et al. |
| 5,785,454 A * | 7/1998 | Ringdal et al. ........ 405/45 |
| 5,803,127 A * | 9/1998 | Rains ................... 138/113 |
| 6,167,914 B1 | 1/2001 | Koteskey .............. 138/110 |
| 6,361,248 B1 * | 3/2002 | Maestro ................ 405/49 |

\* cited by examiner

Primary Examiner—Thomas B. Will
Assistant Examiner—Tara L. Mayo
(74) Attorney, Agent, or Firm—Charles G. Lamb; Middleton Reutlinger

(57) ABSTRACT

An orifice shield for a wastewater drainage conduit is an injection molded unitary body which is cylindrically-shaped with a first open end and an opposed second open end. The body is provided with a top wall and rounded sidewalls extending from the top wall. At least one flow through slot is provided in the top wall of the body to allow the flow of effluent therethrough. The rounded sidewalls terminate in spaced edges which extend along the length of the unitary body for receiving and gripping a conduit. Longitudinally extending spacers are provided along an interior surface of the unitary body for spacing the top wall of the orifice shield from the drainage conduit.

29 Claims, 2 Drawing Sheets

ORIFICE SHIELD FOR A DRAINAGE CONDUIT IN A WASTEWATER TREATMENT DRAIN FIELD

BACKGROUND OF THE INVENTION

This invention relates to a shield which surrounds drainage openings in a conduit and more particularly to a shield for the orifices in a drainage conduit to prevent debris and the like from entering the orifices when the conduit is buried in a wastewater treatment drain field.

In the treatment of wastewater and particularly wastewater that has been treated in a septic tank, or the like, the effluent from the septic tank is transferred into a drain field wherein the effluent is absorbed in the soil. In the preparation of these drain fields to receive wastewater effluent, trenches are generally dug in a preselected arrangement and pipes or conduits with drainage openings or orifices therein are laid into the trenches. Generally these pipes are covered with pebbles or crushed rock which assists in the percolation of the effluent into the soil. However, with this type of arrangement it is very difficult to obtain uniform distribution of the effluent in the drain field as the openings within the pipes can be clogged with dust or fines from the crushed rock or gravel. There have been suggestions, however, of placing shields to prevent the clogging of these orifices or openings, but such shields in many instances have proved to be cumbersome or inefficient in assembling. For example, U.S. Pat. No. 6,167,914 teaches an orifice protector which is of C-shaped cross-section for circumscribing the drainage conduit and cover the orifices in the conduit. Opposed ends of the elongated C-shaped orifice protector are provided with downwardly and inwardly indented portions which define stand-off portions for maintaining the central top portion of the conduit in a spaced relationship with the conduit. One problem in the manufacture of this orifice protector, after the initial step of injection molding of the body of the orifice protector, the orifice protector is subjected to a second manufacturing step of deforming or indenting the ends of the wall of the orifice protector downwardly and inwardly to make the stand-off portions to provide a flow through channel between the inner surface of the orifice protector and the outer surface of the drainage conduit.

SUMMARY OF THE INVENTION

It is an object of the present invention to provide an orifice shield for protecting the orifices in a drainage conduit.

It is another object of the present invention to provide an orifice shield for the drainage openings in a drainage conduit wherein the inner surface of the orifice shield is spaced from the outer surface of the drainage conduit thereby providing for a channel for the drainage of effluent from the drainage conduit.

A further object of the present invention is to provide an orifice shield for a drainage conduit which is manufactured in a one-step injection molded process.

It is also an object of the present invention to provide an orifice shield for a drainage conduit which is relatively inexpensive and easy to install onto a drainage conduit.

More particularly, the present invention provides an orifice shield for wastewater drainage conduit which is an longitudinally extending cylindrically-shaped unitary body having a first open end and an opposed second open end. The shield body includes a top wall section and rounded sidewalls extending from the top wall with at least one flow-through slot in the top wall. The rounded sidewalls end in opposed spaced terminating edges extending along the length of the body for receiving and griping a conduit. At least one longitudinally extending spacer is provided along an interior surface of the body to space the top wall of the unitary body from the drainage conduit.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 4:
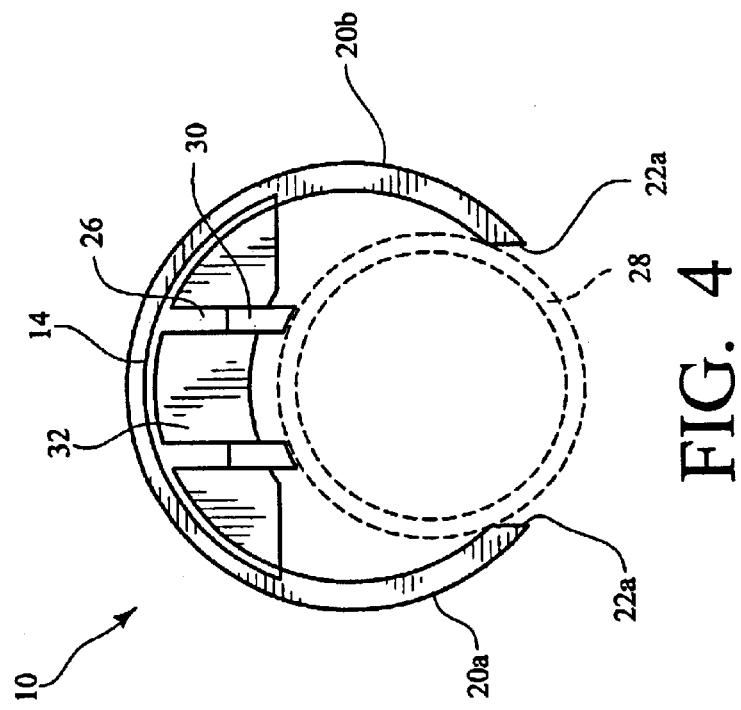
FIG. 4 is an end view of the orifice shield of FIG. 1 showing a drainage conduit in phantom lines; and, FIG. 5 is a top view of the orifice shield of FIG. 1 with selected portions shown in a cut-away section.

As shown in the Figs., an orifice shield 10 of the present invention is comprised of a substantially cylindrically-shaped body 12 which includes an arcuate top wall 14 and opposed rounded sidewalls 20a and 20b. The rounded sidewalls 20a and 20b terminate in terminating edges 22a and 22b, respectively. The terminating edges 22a, 22b are spaced apart a sufficient distance to grasp a conduit 28, as best shown in FIG. 4. Preferably, the orifice shield 10 is of unitary construction and produced by an injection molded plastic process. Moreover, the plastic material from which the orifice shield 10 is made, permits the opposed sides 20a and 20b to be deflected outwardly thereby allowing the terminating edges 22a and 22b to be snapped over and then under the conduit 28.

Figure 2:
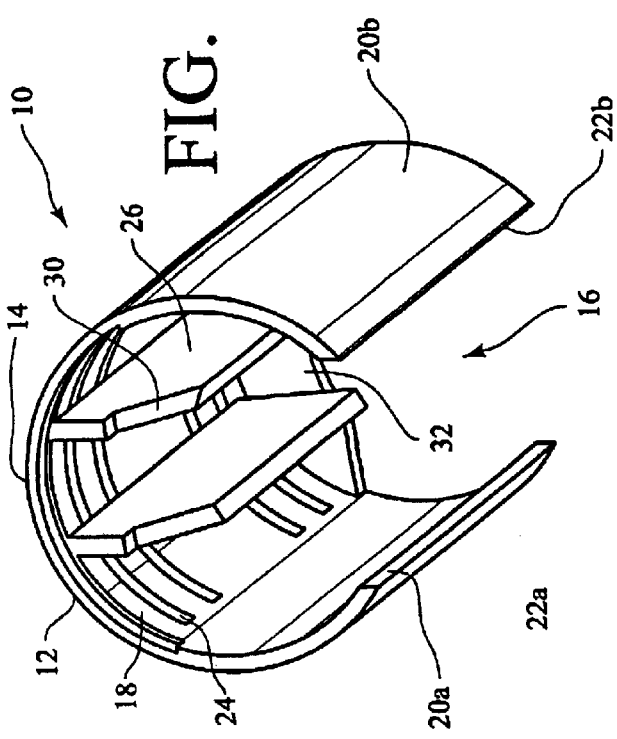
FIG. 2 is a perspective view of the orifice shield of FIG. 1 looking upward toward an opposed second open end of the orifice shield.
Figure 3:
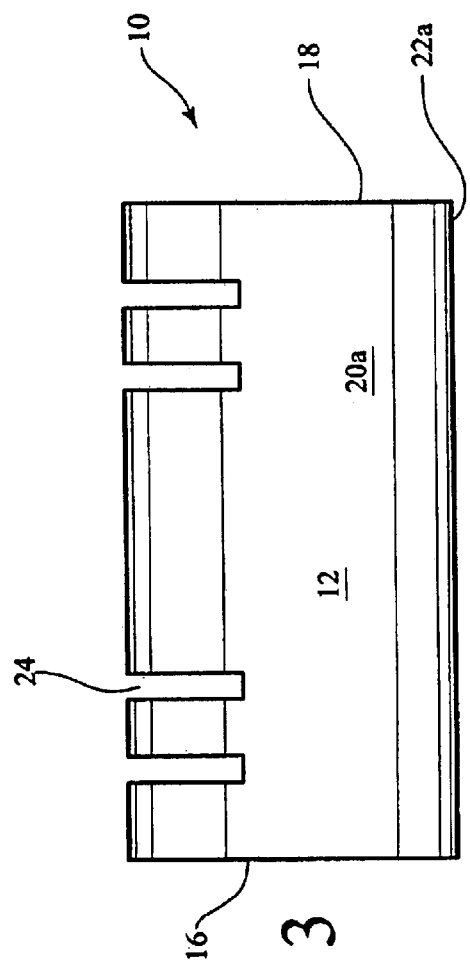
FIG. 3 is a side view of the orifice shield of FIG. 1.
Figure 5:
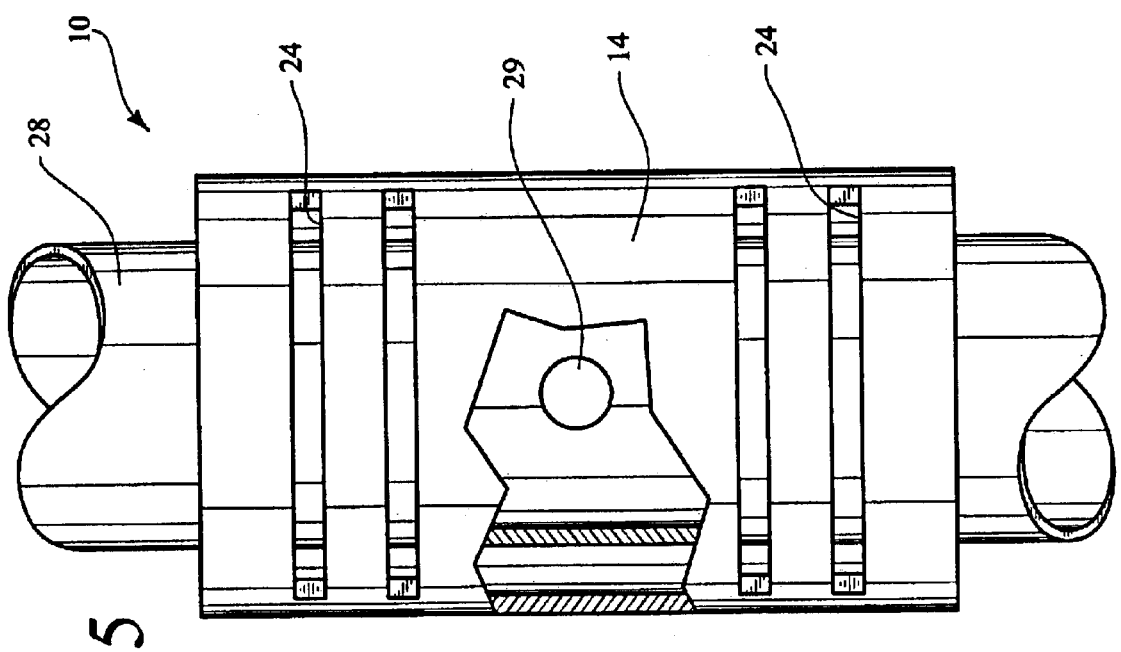

As best shown in FIGS. 2 and 4, at least one longitudinally extending spacer 26 is disposed along an interior surface of the cylindrically-shaped body 12. The spacer 12 spaces the top wall 14 from the conduit 28 thereby providing a channel for the effluent to flow through openings 29, as shown in FIG. 5, in the drainage conduit 28.

Figure 1:
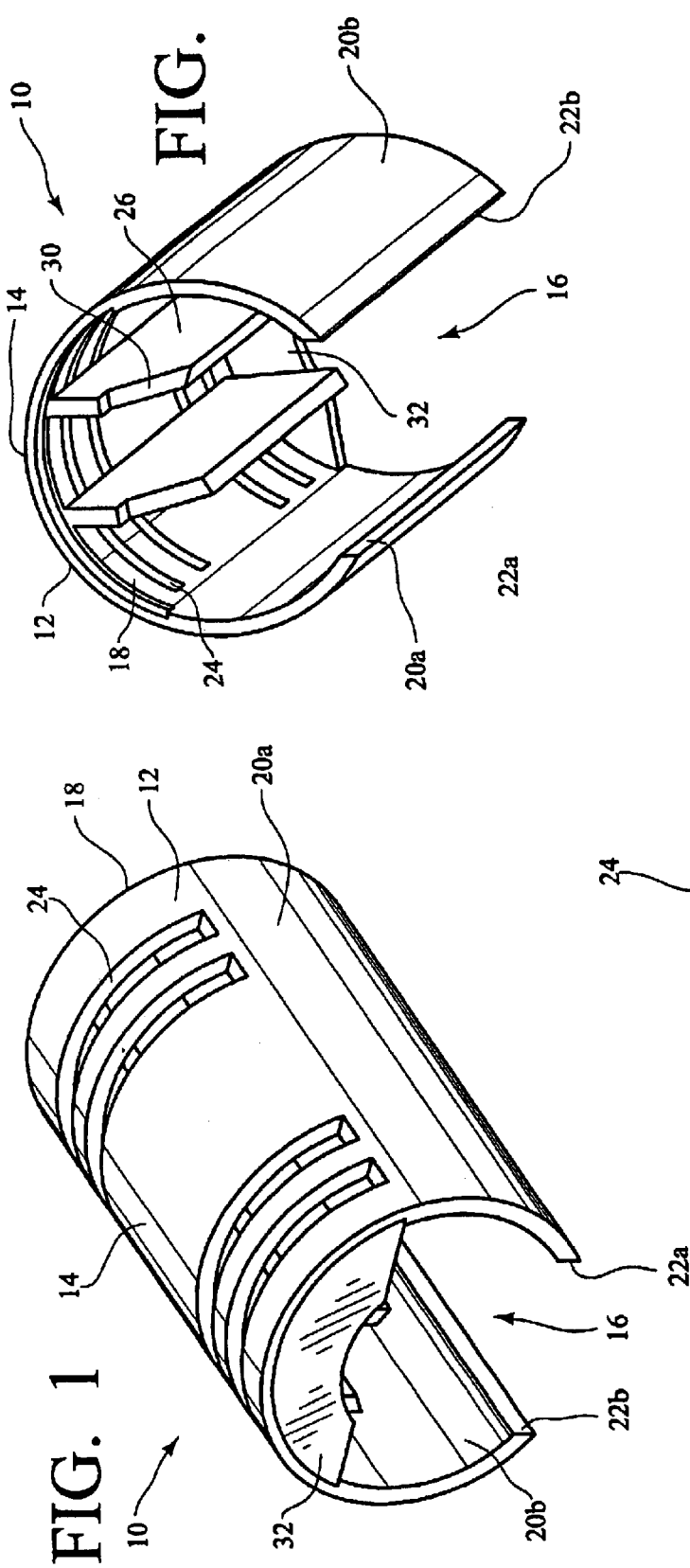
FIG. 1 is a perspective view of one orifice shield of the present invention looking downward to a first open end of the shield.

As best shown in FIGS. 1 and 2, the orifice shield 10 is provided with an end cover 32 which covers the openings 16 or 18 along the upper portions and acts as a barrier to prevent debris from entering the channel defined by the inner surface of the top wall 14 and the outer surface of the drainage conduit 28. Moreover, end cover 32 has a lower edge spaced from the outer surface of conduit 28 to provide means for effluent to flow out of the channel defined between the orifice shield 10 and the conduit 28. Also, as shown in FIG. 2, the spacers 26 are provided with notches 30 at the terminating ends to provide means for water or effluent to flow out of a passage defined by the spacers 26 and the outer surface of the drainage conduit 28 and the inner surface of the orifice shield 10 if slots 24, to be described hereinafter, become plugged.

As shown in the Figs., flow through slots 24 are provided to relieve the effluent which enters the aforedescribed channel from the drainage openings 29. Preferably, a plurality of flow-through slots 24 in the top wall 14 of the unitary body 12 are provided. The slots 24 are generally parallel relative to each other and parallel to the first and second open ends 16 and 18 of the orifice shield 10 and, in one preferred embodiment the slots 24 extend through about a 90° arc length. Moreover, in the area of the center of the top wall 14, the top wall 14 is slot-free as this is the area that generally covers an opening 29 in the drainage conduit 28. This slot-free or solid portion prevents effluent from "squirting" out of opening 29 directly into the drain field thereby providing a non-turbulent or laminar flow through the slots 24. As shown in FIG. 5, one pair of slots 24 is adjacent one end of the shield 10 and a second pair of slots 24 is adjacent the opposed end with a slot-free area directly above opening 29.

As best shown in FIG. 2, there are preferably two spacers 26 which extend longitudinally the length of the conduit. Moreover, preferably, the longitudinally extending spacers are in parallel.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. An orifice shield for a wastewater drainage conduit comprising:
   a) a cylindrically shaped unitary body, having a first open end and an opposed second open end, said body having a top wall and longitudinally extending rounded sidewalls extending from said top section;
   b) at least one flow-through slot in said top wall;
   c) said rounded sidewalls ending in opposed spaced terminating edges extending along the length of said unitary body for receiving and gripping a conduit; and,
   d) at least one longitudinally extending spacer along an interior surface of said top wall for spacing said top wall of said unitary body from said conduit said spacer being integral with said body.

2. The orifice shield of claim 1, said unitary body being an injection molded body.

3. The orifice shield of claim 1, said spacer extending substantially the length of said body.

4. The orifice shield of claim 1, further comprising two longitudinally extending spacers.

5. The orifice shield of claim 4, said longitudinally extending spacers being in parallel.

6. The orifice shield of claim 1, said slot being a plurality of slot openings in said top wall of said unitary body.

7. The orifice shield of claim 6, said plurality of slot openings being parallel to each other and parallel to said first open end and said second open end.

8. The orifice shield of claim 6, said plurality of slot openings extending through about a 90° arc length of said top wall and said sidewalls of said unitary body.

9. The orifice shield of claim 1 including at least one slot adjacent said first end and at least one slot adjacent said second end.

10. The orifice shield of claim 1, wherein a preselected area in said top wall is slot-free.

11. The orifice shield of claim 1 further comprising an end cover over at least one of said first end or said second end.

12. The orifice shield of claim 1, said spacer including a flow-through notch in at least one end.

13. An orifice shield for a wastewater drainage conduit comprising:
   a) a cylindrically-shaped longitudinally extending unitary body having a first open end and an opposed second open end, said body having a top wall and rounded sidewalls extending from said top wall;
   b) a plurality of flow-through slots extending through said unitary body, said slots being in parallel to each other and parallel to said first and said second open ends with a preselected area in the center of said top wall being slot free;
   c) said rounded sidewalls ending in opposed spaced terminating edges extending along the length of said unitary body for receiving and gripping a conduit; and,
   d) a plurality of longitudinally extending spacers along an interior surface of said top wall spacing said top wall of said unitary body from said conduit, said spacers being integral with and extending substantially the length of said body.

14. The orifice shield of claim 13, said unitary body being an injection molded body.

15. The orifice shield of claim 13, said plurality of slot openings extending through about a 90° arc length of said top wall and said sidewalls of said unitary body.

16. The orifice shield of claim 13 further comprising an end cover over one of said first end or said second end.

17. The orifice shield of claim 13, said spacer including a notch in at least one end.

18. In combination with a drainage conduit having a flow-through opening in a wall of said conduit, an orifice shield for a wastewater drainage conduit comprising:
   a) a cylindrically shaped unitary body having a first open end and an opposed second open end, said body having a top wall and longitudinally extending rounded sidewalls extending from said top wall;
   b) at least one flow-through slot in said top wall;
   c) said rounded sidewalls ending in opposed spaced terminating edges extending along the length of said unitary body for receiving and gripping said conduit; and,
   d) at least one longitudinally extending spacer along an interior surface of said top wall, for spacing said top wall of said unitary body from said conduit, said spacer being integral with said body.

19. The combination of claim 18, said unitary body being an injection molded body.

20. The combination of claim 18, said spacer extending substantially the length of said body.

21. The combination of claim 18, further comprising two longitudinally extending spacers along an inner surface of said top wall.

22. The combination of claim 21, said longitudinally extending spacers being in parallel.

23. The combination of claim 18, said slot being a plurality of slot openings in said top wall of said unitary body.

24. The combination of claim 23, said plurality of slot openings being parallel to each other and parallel to said first open end and said second open end.

25. The combination of claim 23, said plurality of slot openings extending through about a 90° arc length of said top wall and said sidewalls of said unitary body.

26. The combination of claim 18 including at least one slot adjacent said first end and at least one slot adjacent said second end.

27. The combination of claim 18, wherein a preselected area in said top wall is slot-free, said preselected area being over said opening in said wall of said drainage conduit.

28. The combination of claim 18 further comprising an end cover over at least one of said first end or said second end.

29. The combination of claim 18, said spacer including a flow-around notch in at least one end.

* * * * *